(12) United States Patent
Thubert et al.

(10) Patent No.: US 10,945,296 B2
(45) Date of Patent: Mar. 9, 2021

(54) SYNCHRONIZATION AND RESERVATION BASED ON SUB TIMESLOTS FOR UNALIGNED WIRELESS COMMUNICATIONS

(71) Applicant: Cisco Technology, Inc., San Jose, CA (US)

(72) Inventors: Pascal Thubert, La Colle sur Loup (FR); Feiliang Wang, Shanghai (CN); Huimin She, Shanghai (CN); Patrick Wetterwald, Mouans Sartoux (FR)

(73) Assignee: Cisco Technology, Inc., San Jose, CA (US)

( * ) Notice: Subject to any disclaimer, the term of this patent is extended or adjusted under 35 U.S.C. 154(b) by 6 days.

(21) Appl. No.: 16/246,953

(22) Filed: Jan. 14, 2019

(65) Prior Publication Data
US 2020/0229246 A1 Jul. 16, 2020

(51) Int. Cl.
*H04W 74/08* (2009.01)
*H04W 56/00* (2009.01)
*H04W 74/00* (2009.01)

(52) U.S. Cl.
CPC ... *H04W 74/0891* (2013.01); *H04W 56/0015* (2013.01); *H04W 74/006* (2013.01)

(58) Field of Classification Search
None
See application file for complete search history.

(56) References Cited

U.S. PATENT DOCUMENTS

| 8,842,630 | B2 | 9/2014 | Shaffer et al. | |
|---|---|---|---|---|
| 9,072,100 | B2 | 6/2015 | Vasseur et al. | |
| 9,351,301 | B2 | 5/2016 | Lee et al. | |
| 2011/0286424 | A1* | 11/2011 | Jeon | H04W 36/12 370/329 |
| 2012/0250664 | A1 | 10/2012 | Li | |
| 2014/0328199 | A1* | 11/2014 | Matischek | H04W 72/085 370/252 |
| 2018/0049164 | A1* | 2/2018 | Wu | H04W 72/042 |

(Continued)

OTHER PUBLICATIONS

Bekmezci, et al., "New TDMA based sensor network for military monitoring (MIL-MON)", MILCOM 2005—IEEE Military Communications Conference, Atlantic City, NJ, 2005, vol. 4., pp. 2238-2243, IEEE.

(Continued)

*Primary Examiner* — Christine T Duong
(74) *Attorney, Agent, or Firm* — Behmke Innovation Group; James M. Behmke; James J. Wong

(57) ABSTRACT

In one embodiment, a parent device in an unaligned wireless network may determine a superframe comprising a header timeslot followed by a plurality of sub timeslots. The parent device may transmit, to a plurality of child devices in the unaligned wireless network, a beacon during the header timeslot, wherein the beacon comprises i) synchronization information used by the plurality of child devices to synchronize to the header timeslot and ii) reservation information that indicates one or more reserved sub timeslots of the plurality of sub timeslots. The parent device may receive, from a particular child device of the plurality of child devices, a message during a particular sub timeslot of the plurality of sub timeslots that is different than the one or more reserved sub timeslots.

20 Claims, 7 Drawing Sheets

(56) References Cited

U.S. PATENT DOCUMENTS

2019/0141484 A1\* 5/2019 Singamsetty ........... H04L 67/22
2019/0173654 A1\* 6/2019 Mayer ............... H04W 72/0446

OTHER PUBLICATIONS

Dujovne, et al., "6TISCH: Deterministic IP-Enabled Industrial Internet (of Things)", IEEE Communications Magazine—Communications Standards Supplement, pp. 36-41, Dec. 2014, IEEE.

Sixto, et al., "Scheduling the Real-Time Transmission of Periodic Measurements in 802.15.4 Wireless Sensor Network", Procedia Computer Science 114, pp. 499-506, 2017, Elsevier B.V.

Vilajosana, et al., "Minimal IPv6 Over the TSCH Mode of IEEE 802.15.4e (6TiSCH) Configuration", Request for Comments 8180, 28 pages, May 2007, Internet Engineering Task Force Trust.

Wang, et al., "6TiSCH Operation Sublayer Protocol (6P)", 6TiSCH Internet-Draft, <draft-ietf-6tisch-6top-protocol-12>, 47 pages, Jun. 20, 2018, IETF Trust.

\* cited by examiner

SYNCHRONIZATION AND RESERVATION BASED ON SUB TIMESLOTS FOR UNALIGNED WIRELESS COMMUNICATIONS

TECHNICAL FIELD

The present disclosure relates generally to computer networks, and, more particularly, to synchronization and reservation based on sub timeslots for unaligned wireless communications.

BACKGROUND

Low power and Lossy Networks (LLNs), for example, sensor networks, have a myriad of applications, such as Smart Grid and Smart Cities. Various challenges are presented with LLNs, such as lossy links, low bandwidth, battery operation, low memory and/or processing capability of a device, etc. Changing environmental conditions may also affect device communications. For example, physical obstructions (e.g., changes in the foliage density of nearby trees, the opening and closing of doors, etc.), changes in interference (e.g., from other wireless networks or devices), propagation characteristics of the media (e.g., temperature or humidity changes, etc.), and the like, also present unique challenges to LLNs.

In contrast to many traditional computer networks, LLN devices typically communicate via shared-media links. For example, LLN devices that communicate wirelessly may communicate using overlapping wireless channels (e.g., frequencies). In other cases, LLN devices may communicate with one another using shared power line communication (PLC) links. For example, in a Smart Grid deployment, an electric utility may distribute power to various physical locations. At each location, there may be a smart meter that communicates wirelessly and/or uses the electrical power distribution line itself as a communication medium.

Smart Grid networks typically support random communication traffic on the communication medium. To prevent the communication medium from becoming overloaded by too many nodes using the medium at once, communication schedules may be put into place in the network, thereby allowing each node to know when its neighbors will be communicating on the medium and for how long. However, the timeslots of such schedules are also typically unsynchronized across the entire network, still leading to the potential for collisions and other conditions that could impinge on the traffic in the network.

BRIEF DESCRIPTION OF THE DRAWINGS

The embodiments herein may be better understood by referring to the following description in conjunction with the accompanying drawings in which like reference numerals indicate identically or functionally similar elements, of which.

DESCRIPTION OF EXAMPLE EMBODIMENTS

Overview

Figure 1:
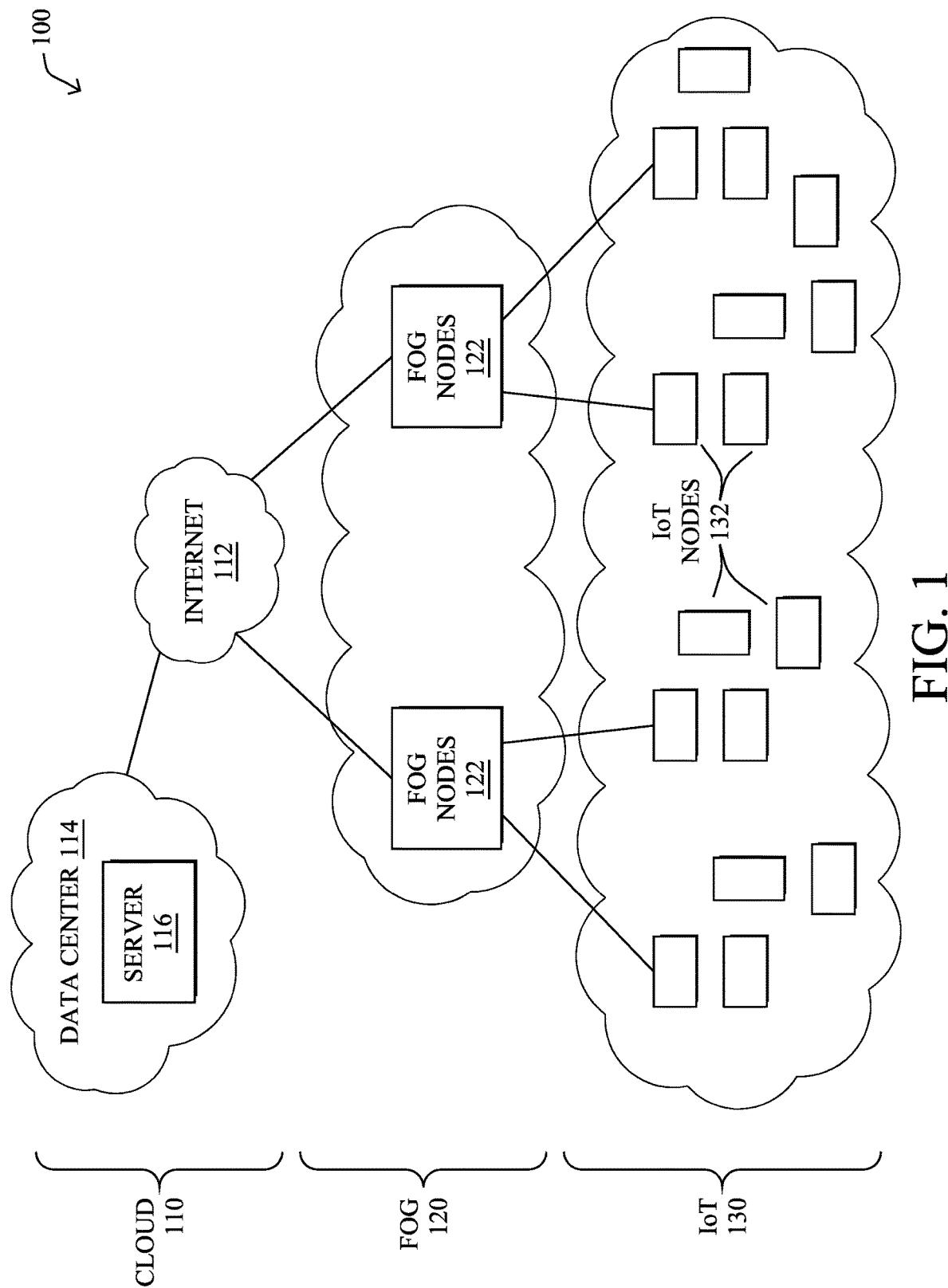
FIG. 1 illustrates an example communication network.

According to one or more embodiments of the disclosure, a parent device in an unaligned wireless network may determine a superframe comprising a header timeslot followed by a plurality of sub timeslots. The parent device may transmit, to a plurality of child devices in the unaligned wireless network, a beacon during the header timeslot, wherein the beacon comprises i) synchronization information used by the plurality of child devices to synchronize to the header timeslot and ii) reservation information that indicates one or more reserved sub timeslots of the plurality of sub timeslots. The parent device may receive, from a particular child device of the plurality of child devices, a message during a particular sub timeslot of the plurality of sub timeslots that is different than the one or more reserved sub timeslots.

According to one or more embodiments of the disclosure, a child device in an unaligned wireless network may synchronize to a header timeslot of a superframe using synchronization information provided in a beacon that is transmitted by a parent device. The child device may select a particular sub timeslot from a plurality of sub timeslots that follow the header timeslot using reservation information provided in the beacon, wherein the particular sub timeslot is different than one or more reserved sub timeslots that are indicated by the reservation information. The child device may send, to the parent device a message during the particular sub timeslot of the plurality of sub timeslots.

Description

A computer network is a geographically distributed collection of nodes interconnected by communication links and segments for transporting data between end nodes, such as personal computers and workstations, or other devices, such as sensors, actuators, etc. Many types of networks are available, ranging from local area networks (LANs) to wide area networks (WANs). LANs typically connect the nodes over dedicated private communications links located in the same general physical location, such as a building or campus. WANs, on the other hand, typically connect geographically dispersed nodes over long-distance communications links, such as common carrier telephone lines, optical lightpaths, synchronous optical networks (SONET), synchronous digital hierarchy (SDH) links, or Powerline Communications (PLC), long distance wireless links, and others. Other types of networks, such as field area networks (FANs), neighborhood area networks (NANs), personal area networks (PANs), etc. may also make up the components of any given computer network.

The nodes typically communicate over the network by exchanging discrete frames or packets of data according to predefined protocols, such as the Transmission Control Protocol/Internet Protocol (TCP/IP). In this context, a protocol consists of a set of rules defining how the nodes interact with each other. Computer networks may be further interconnected by an intermediate network node, such as a router, to extend the effective "size" of each network.

In various embodiments, computer networks may include an Internet of Things network. Loosely, the term "Internet of Things" or "IoT" (or "Internet of Everything" or "IoE") refers to uniquely identifiable objects (things) and their virtual representations in a network-based architecture. In particular, the IoT provides the ability to connect more than just computers and communications devices, but rather the ability to connect "objects" in general, such as lights, appliances, vehicles, heating, ventilating, and air-conditioning (HVAC), windows and window shades and blinds, doors, locks, etc. The "Internet of Things" thus generally refers to the interconnection of objects (e.g., smart objects), such as sensors and actuators, over a computer network (e.g., via IP), which may be the public Internet or a private network. Often, IoT networks operate within a shared-media mesh networks, such as wireless or PLC networks, etc. IoT networks are comprised of anything from a few dozen to thousands or even millions of devices, and support point-to-point traffic (between devices inside the network), point-to-multipoint traffic (from a central control point such as a root node to a subset of devices inside the network), and multipoint-to-point traffic (from devices inside the network towards a central control point).

Fog computing is a distributed approach of cloud implementation that acts as an intermediate layer from local networks (e.g., IoT networks or user networks) to the Cloud (e.g., centralized and/or shared resources, as will be understood by those skilled in the art). That is, generally, fog computing entails using layers of devices at or near the network edge to provide application services to the local nodes in the network, in contrast to cloud-based approaches that rely on remote data centers/cloud environments for the services. To this end, a fog node is a functional node that is deployed close to IoT endpoints to provide computing, storage, and networking resources and services. Multiple fog nodes organized or configured together form a fog system, to implement a particular solution. Fog nodes and fog systems can have the same or complementary capabilities, in various implementations. That is, each individual fog node does not have to implement the entire spectrum of capabilities. Instead, the fog capabilities may be distributed across multiple fog nodes and systems, which may collaborate to help each other to provide the desired services. In other words, a fog system can include any number of virtualized services and/or data stores that are spread across the distributed fog nodes. This may include a master-slave configuration, publish-subscribe configuration, or peer-to-peer (P2P) configuration.

FIG. 1 is a schematic block diagram of an example simplified computer network 100 illustratively comprising nodes/devices at various levels of the network, interconnected by various methods of communication. For instance, the links may be wired links or shared media (e.g., wireless links, PLC links, etc.) where certain nodes, such as, e.g., routers, sensors, computers, etc., may be in communication with other devices, e.g., based on connectivity, distance, signal strength, current operational status, energy reserves, load factors, location, etc.

Specifically, as shown in the example network 100, three illustrative layers are shown, namely the cloud network 110 (the Cloud), fog network 120 (the Fog), and IoT network 130 (with IoT nodes ("things" or "endpoints") 132). Illustratively, the Cloud 110 may comprise general connectivity via the Internet 112, and may contain one or more datacenters 114 with one or more centralized servers 116 or other devices, as will be appreciated by those skilled in the art. Within the fog layer 120, various fog nodes/devices 122 (e.g., with fog modules, described below) may execute various fog computing resources on network edge devices, as opposed to datacenter/cloud-based servers or on the endpoint nodes 132 themselves of the IoT layer 130. Data packets (e.g., traffic and/or messages sent between the devices/nodes) may be exchanged among the nodes/devices of the computer network 100 using predefined network communication protocols such as certain known wired protocols, wireless protocols, PLC protocols, or other shared-media protocols where appropriate. In this context, a protocol consists of a set of rules defining how the nodes interact with each other. Resources in fog nodes 122 and the links surrounding them may be shared between different users, applications, organizations, or tenants in IoT network 130.

Those skilled in the art will understand that any number of nodes, devices, links, etc. may be used in the computer network, and that the view shown herein is for simplicity. Also, those skilled in the art will further understand that while the network is shown in a certain orientation, the network 100 is merely an example illustration that is not meant to limit the disclosure. For example "real-world" computer networks may comprise any type of network, including, among others, Fog networks, IoT networks, cloud networks, core networks, backbone networks, data centers, enterprise networks, provider networks, customer networks, virtualized networks (e.g., virtual private networks or "VPNs"), combinations thereof, and so on. Also note that while one layer of fog nodes 122 is shown, the fog layer 120 can comprise a hierarchy of fog layers. Note further that the network environments and their associated devices may also be located in different geographic locations.

Figure 2:
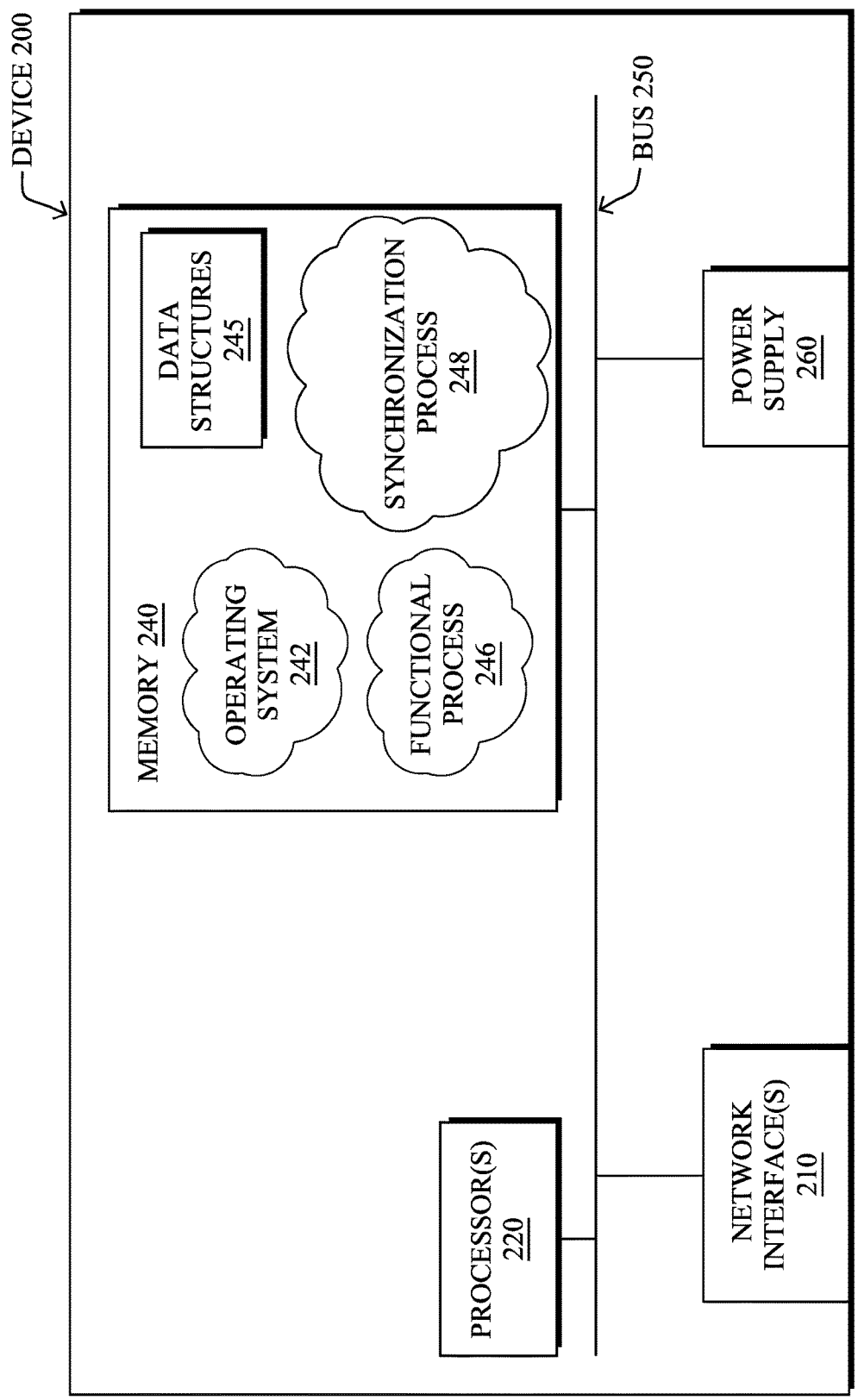
FIG. 2 illustrates an example network device/node.

FIG. 2 is a schematic block diagram of an example computing device 200 that may be used with one or more embodiments described herein e.g., as any of the devices shown in FIG. 1 above, and particularly as specific devices as described further below. The device may comprise one or more network interfaces 210 (e.g., wired, wireless, etc.), at least one processor 220, and a memory 240 interconnected by a system bus 250, as well as a power supply 260 (e.g., battery, plug-in, etc.).

The network interface(s) 210 contain the mechanical, electrical, and signaling circuitry for communicating data over links coupled to the network 100, e.g., providing a data connection between device 200 and the data network, such as the Internet. The network interfaces may be configured to transmit and/or receive data using a variety of different communication protocols. For example, interfaces 210 may include wired transceivers, WiFi transceivers, cellular transceivers, or the like, each to allow device 200 to communicate information to and from a remote computing device or server over an appropriate network. The same network interfaces 210 also allow communities of multiple devices 200 to interconnect among themselves, either P2P, or up and down a hierarchy. Note, further, that the nodes may have two different types of network connections 210, e.g., wireless and wired/physical connections, and that the view herein is merely for illustration. Also, while the network interface 210 is shown separately from power supply 260, for devices using powerline communication (PLC) or Power over Ethernet (PoE), the network interface 210 may communicate through the power supply 260, or may be an integral component of the power supply.

The memory 240 comprises a plurality of storage locations that are addressable by the processor 220 and the network interfaces 210 for storing software programs and data structures associated with the embodiments described herein. The processor 220 may comprise hardware elements or hardware logic adapted to execute the software programs and manipulate the data structures 245. An operating system 242, portions of which are typically resident in memory 240 and executed by the processor, functionally organizes the device by, among other things, invoking operations in support of software processes and/or services executing on the device. These software processes and/or services may comprise one or more functional processes 246, and on certain devices, an illustrative "synchronization" process 248, as described herein. Notably, functional processes 246, when executed by processor(s) 220, cause each particular device 200 to perform the various functions corresponding to the particular device's purpose and general configuration. For example, a router would be configured to operate as a router, a server would be configured to operate as a server, an access point (or gateway) would be configured to operate as an access point (or gateway), and so on.

It will be apparent to those skilled in the art that other processor and memory types, including various computer-readable media, may be used to store and execute program instructions pertaining to the techniques described herein. Also, while the description illustrates various processes, it is expressly contemplated that various processes may be embodied as modules configured to operate in accordance with the techniques herein (e.g., according to the functionality of a similar process). Further, while the processes have been shown separately, those skilled in the art will appreciate that processes may be routines or modules within other processes.

Classical Operational Technology (OT) applications such as industrial automation and control systems (IACS) typically rely on wired serial P2P links and buses in order to ensure a controlled and repeatable experience of the transmission, every time. In order to converge OT with Information Technology (IT), IP over wired and wireless technologies (e.g., utilities and smart grid networks) must become more deterministic. Example environments that benefit from deterministic networking (such as deterministic Ethernet) include industrial engineering or other networks requiring precision control timing (e.g., controlling actuators at a precise time). Originally designed for best effort traffic and relying on statistical multiplexing to optimize the use of shared links, these technologies are now being upgraded to provide new levels of guarantees in terms of reliability and timeliness as well as deterministic traffic.

Utilities and smart grid networks, contrastingly, are optimized for stochastic traffic. Consequently, conventional wireless network protocols for utilities and smart grid lead to unaligned wireless networks. In an example, an unaligned wireless network can use timeslots of 128 milliseconds (ms) that are not globally synchronized (e.g., as in Wi-SUN) to facilitate communication among nodes. A node in the unaligned wireless network needs to be aware of and maintain, for each neighboring node, when a timeslot of 128 ms starts (for communication with each neighboring node). Since the timeslot is long, there can be more desynchronization (and, thus, the lack of scheduling) between a sender node and a listener node. Negative aspects of unaligned wireless networks include:

1) a sender node may start sending to a listener node anytime while the listener node is already receiving a transmission from another node, augmenting the chances of hidden terminal collision, due to the unaligned wireless network implementing an ALOHA random access protocol as opposed to a slotted ALOHA random access protocol;

2) wasted interframe space due to application of carrier-sense multiple access with collision avoidance (CSMA/CA) inside the timeslots to mitigate bandwidth loss transmission of a frame that may need less time than the length of a timeslot (e.g., 128 ms);

3) inability to use transmission(s) for synchronization because the transmission(s) can occur anywhere in a timeslot of an unaligned wireless network; and 4) lack of resource reservation for particular transmissions (e.g., for deterministic traffic).

Accordingly, there is a need for future versions of unaligned wireless networks, specifically for utilities and smart grid networks, to provide controlled and repeatable quality of the transmissions.

—Synchronization and Reservation Based on Sub Timeslots for Unaligned Wireless Communications—

As noted above, conventional utilities and smart grid networks are typically implemented as unaligned wireless networks. Unaligned wireless networks are often categorized as slow hopping technologies because they comprise long timeslots (e.g., 128 ms) during which sending nodes transmit and listening nodes receive transmissions (e.g., messages). Due to the long timeslots, there are ample opportunities for transmissions from a plurality of nodes, leading to collisions during the transmissions. Conventionally, CSMA/CA has been used to address this issue. However, synchronization and scheduling among the nodes of an unaligned wireless network is not possible when CSMA/CA is used.

The techniques herein enable synchronization and reservation in slow hopping technologies (e.g., unaligned wireless networks) that comprise long timeslots. In particular, CSMA/CA within the long timeslots is replaced with a superframe that can be used for synchronizing and scheduling among nodes of unaligned wireless networks. The nodes can be low power (sleeping) devices. The superframe can comprise a plurality of timeslots preceded by a header timeslot. The header timeslot is used by a receiver node to advertise beacon-type information and whether some sub timeslots are reserved. Sender nodes listen to that transmission and may use it to synchronize if the receiver is a time parent. The sender nodes then send at a specific offset within the superframe. If a sender node is a time parent to the receiver node, then the receiver node may re-synchronize to the specific offset within the superframe. Further, the receiver node can reserve sub timeslots that are not reserved for future transmissions (e.g., for deterministic traffic).

Stated in another way, synchronization of timeslots among nodes in unaligned wireless networks (e.g., utilities and smart grid networks) is established with the superframe. The resulting operation is equivalent to slotted ALOHA, where only the first timeslot in a slot frame is used for communication and all other timeslots are idle for power saving or used for some other activity. In an example, a directed acyclic graph (DAG) network (e.g., implemented using Routing Protocol for Low-Power and Lossy Networks (LLN)) can be used to disseminate synchronization (e.g., timing) information.

Specifically, according to one or more embodiments of the disclosure as described in detail below, a parent device in an unaligned wireless network may determine a superframe comprising a header timeslot followed by a plurality of sub timeslots. The parent device may transmit, to a plurality of child devices in the unaligned wireless network, a beacon during the header timeslot, wherein the beacon comprises i) synchronization information used by the plurality of child devices to synchronize to the header timeslot and ii) reservation information that indicates one or more reserved sub timeslots of the plurality of sub timeslots. The parent device may receive, from a particular child device of the plurality of child devices, a message during a particular sub timeslot of the plurality of sub timeslots that is different than the one or more reserved sub timeslots. Further, according to one or more embodiments of the disclosure, a child device in an unaligned wireless network may synchronize to a header timeslot of a superframe using synchronization information provided in a beacon that is transmitted by a parent device. The child device may select a particular sub timeslot from a plurality of sub timeslots that follow the header timeslot using reservation information provided in the beacon, wherein the particular sub timeslot is different than one or more reserved sub timeslots that are indicated by the reservation information. The child device may send, to the parent device a message during the particular sub timeslot of the plurality of sub timeslots.

Illustratively, the techniques described herein may be performed by hardware, software, and/or firmware, such as in accordance with the synchronization process 248, which may include computer executable instructions executed by the processor 220 (or independent processor of interfaces 210) to perform functions relating to the techniques described herein, e.g., in conjunction with routing process 244.

Figure 3:
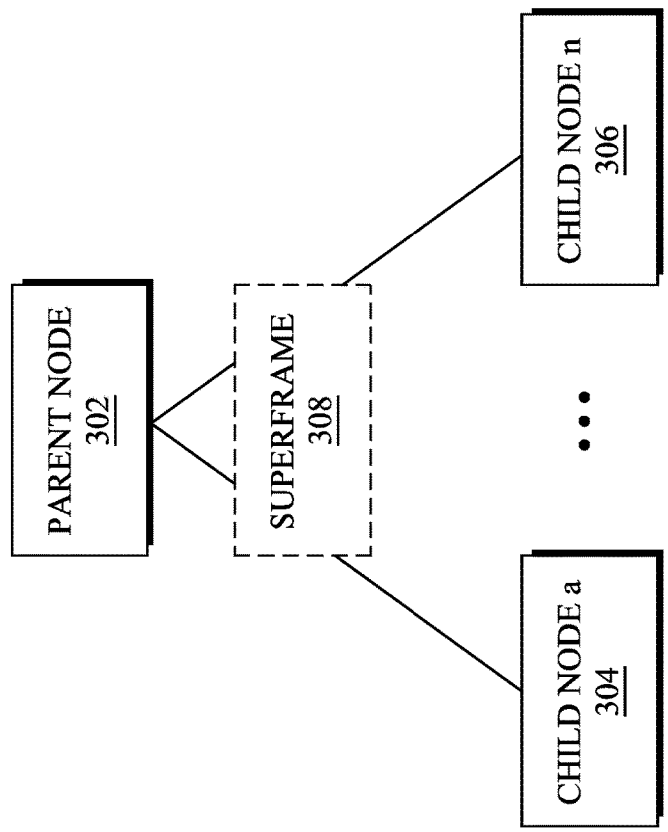
FIG. 3 illustrates an example of a simplified network configured for synchronization and reservation based on sub timeslots for unaligned wireless communications.

Operationally, consider the example of a simplified network configured for synchronization and reservation based on sub timeslots for unaligned wireless communications in FIG. 3. As shown, the simplified network 300 comprises a parent node 302 and a plurality of child nodes 304-306. The parent node 302 can be configured to determine and transmit a superframe 308.

Figure 4:
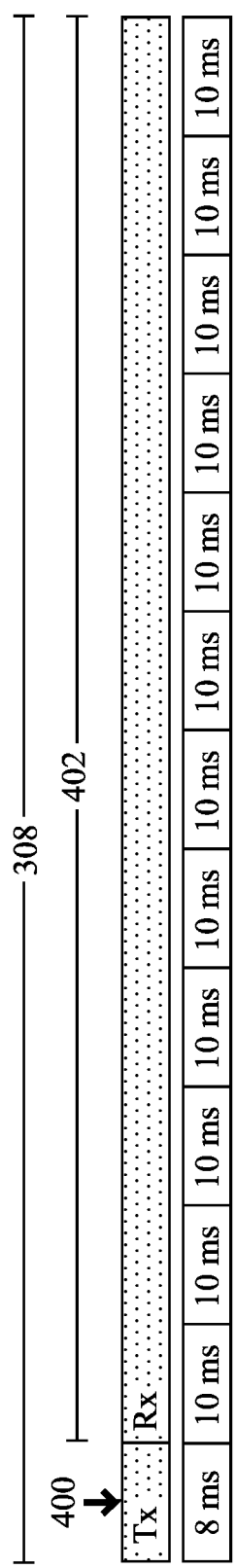
FIG. 4 illustrates an example superframe.

Turning to FIG. 4, an example superframe 308 is shown. As shown, the superframe 308 comprises multiple sub timeslots. The first sub timeslot can be considered a header timeslot 400 used for a transmit (Tx) phase where the parent node 302 emits a beacon. Following the header timeslot 400 is a plurality of receive (Rx) sub timeslots 402. In the example shown in FIG. 4, the header timeslot 400 is 8 milliseconds (ms) and each of the plurality of sub timeslots is 10 ms (there are 12 sub timeslots shown in FIG. 4). Further in the example show, there are 10 sub time slots; thus, the total length of the superframe is 128 ms.

The parent node 302 can use the beacon during the header timeslot 400 to pass synchronization information, so idle child nodes 304-306 may listen to the header timeslot 400 of the superframe 308 to synchronize to the header timeslot 400. Further, the parent node 302 can use the beacon to pass reservation information that indicates which timeslots (that follow the header timeslots) are reserved and may not be used by other nodes. The reservation information can optionally indicate a device that has reserved the timeslots. The reservation information allows the simplified wireless network to facilitate deterministic traffic. Generally, the child nodes 304-306 avoid sending packets or messages during the header timeslot 400 to resolve packet conflicts with among the child nodes 304-306.

The child nodes 304-306 may use any of the plurality of sub timeslots 402 unless a sub timeslot is reserved by another device, as indicated by the parent node 302 in the header timeslot 400. The child nodes 304-306 may reserve a sub timeslot in advance with the parent node 302 according to reservation protocols known in the art. Further, the child nodes 304-306 indicate, in a message transmitted by each child node to the parent node 302, which sub timeslots are used by the child nodes 304-306. The child nodes 304-306 may also indicate a range or length of the message (e.g., in time or duration) if the message is longer than one sub timeslot, thereby allowing the child nodes 304-306 to couple multiple sub timeslots to enable lower physical layer (PHY) rates.

The child nodes 304-306 may use sender may use IPv6 over Low-Power Wireless Personal Area Networks (6LoW-PAN) fragmentation to fit transmissions in the sub timeslots 402. Further, the child nodes 304-306 may use media access control (MAC) randomization to select sub timeslots to limit chances of collisions of transmissions by the child node 304-306.

Figure 5:
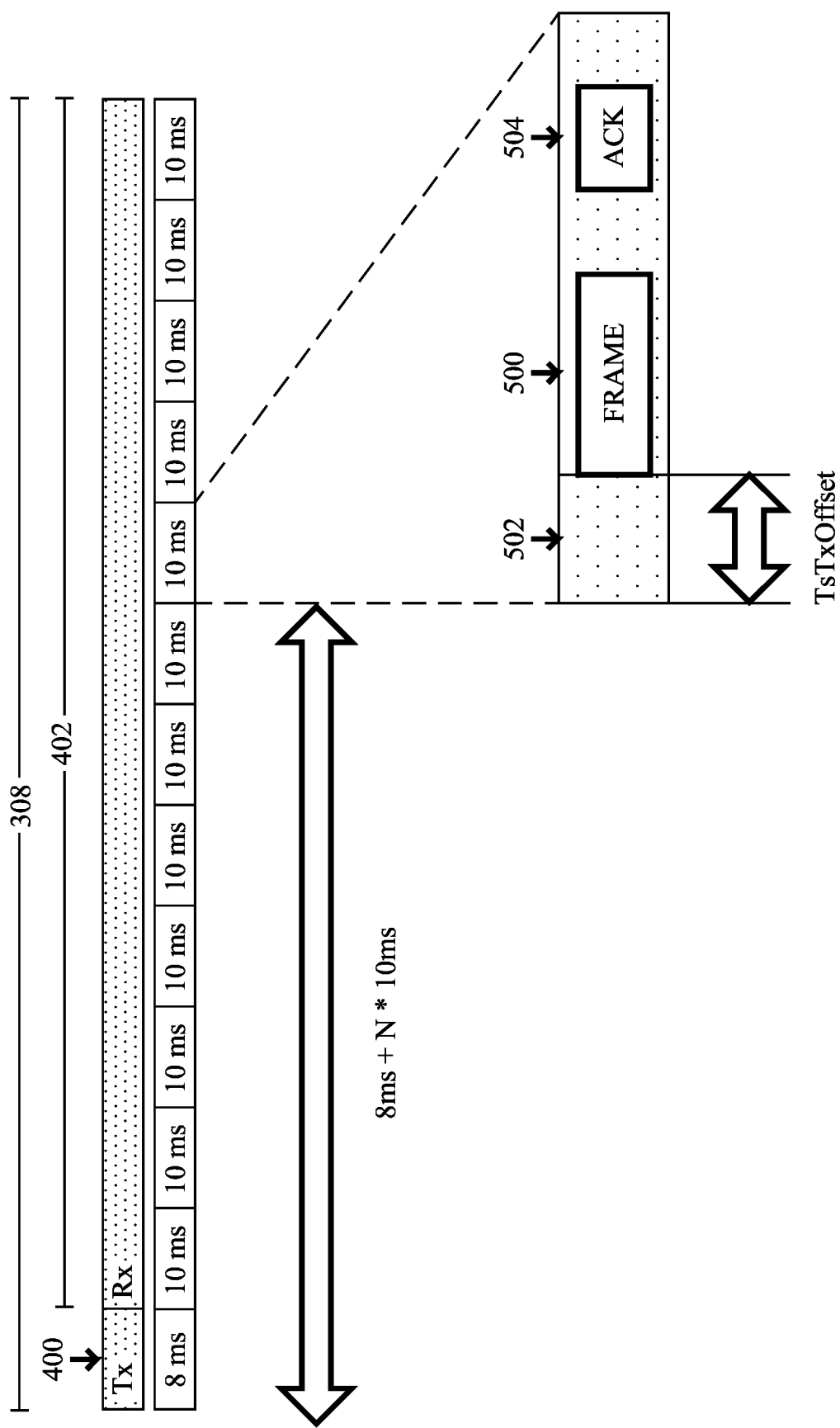
FIG. 5 illustrates an example message transmitted by a child node.

With reference to FIG. 5, an example message transmitted by a child node is shown. In particular, a child node in the plurality of child nodes 304-306 starts transmitting the message 500 at a precise offset (TsTxOffset) 502 from the beginning of a sub timeslot. Further, an acknowledgment 504 comes with a fixed offset in the last time slot and also be used for synchronization (in situations where the message is longer than one sub timeslot).

In an embodiment, backward compatibility with parent nodes that do not support the superframe 308 (e.g., a parent node does not send the beacon during the header timeslot 400) can be ensured. In particular, non-supporting parent nodes are still aware of a global time and will still emit transmissions based on time slot boundaries within a virtual superframe.

In an embodiment, backward compatibility with child nodes that do not support the superframe 308 is ensured because the non-supporting child nodes can detect when the parent node 302 emits a transmission during the header timeslot 400 (e.g., a collision) and refrain from transmitting messages. Further, the non-supporting child nodes will transmit messages at random times and can conduct clear channel assessment (CCA).

Figure 6:
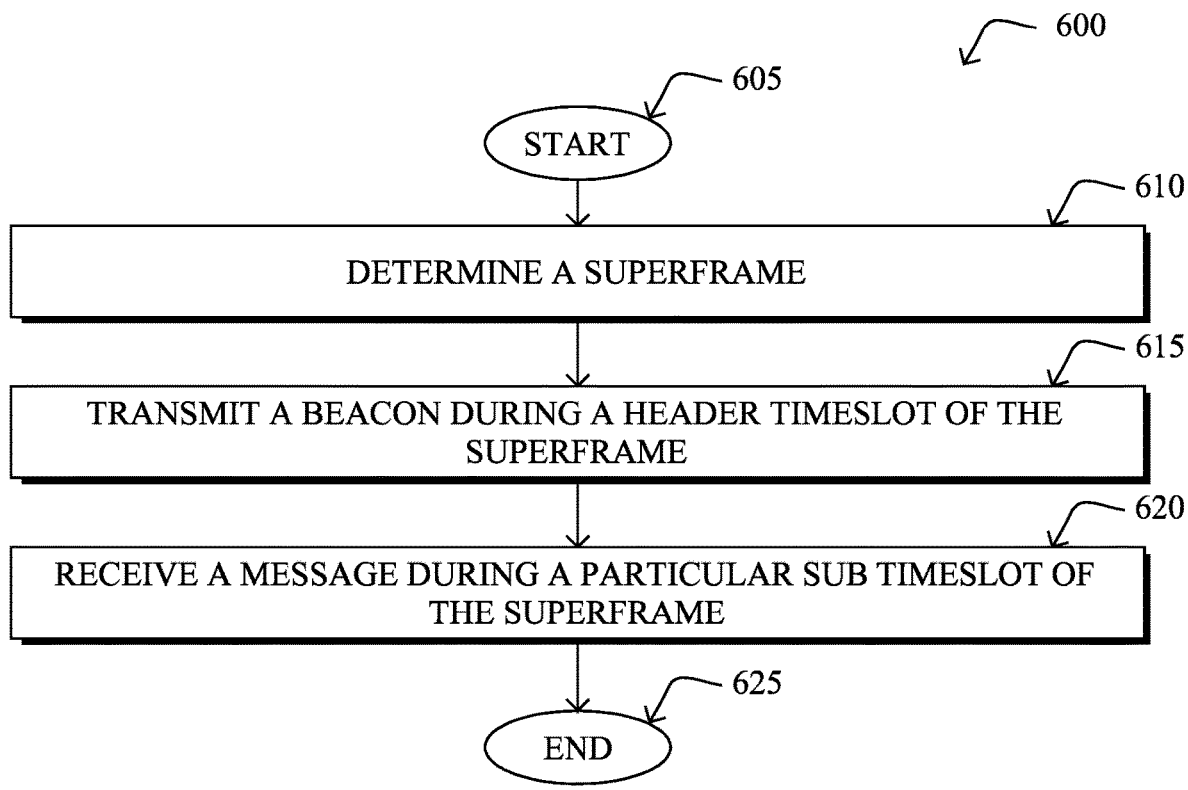
FIGS. 6-7 illustrate example simplified procedures for synchronization and reservation based on sub timeslots for unaligned wireless communications.
Figure 7:
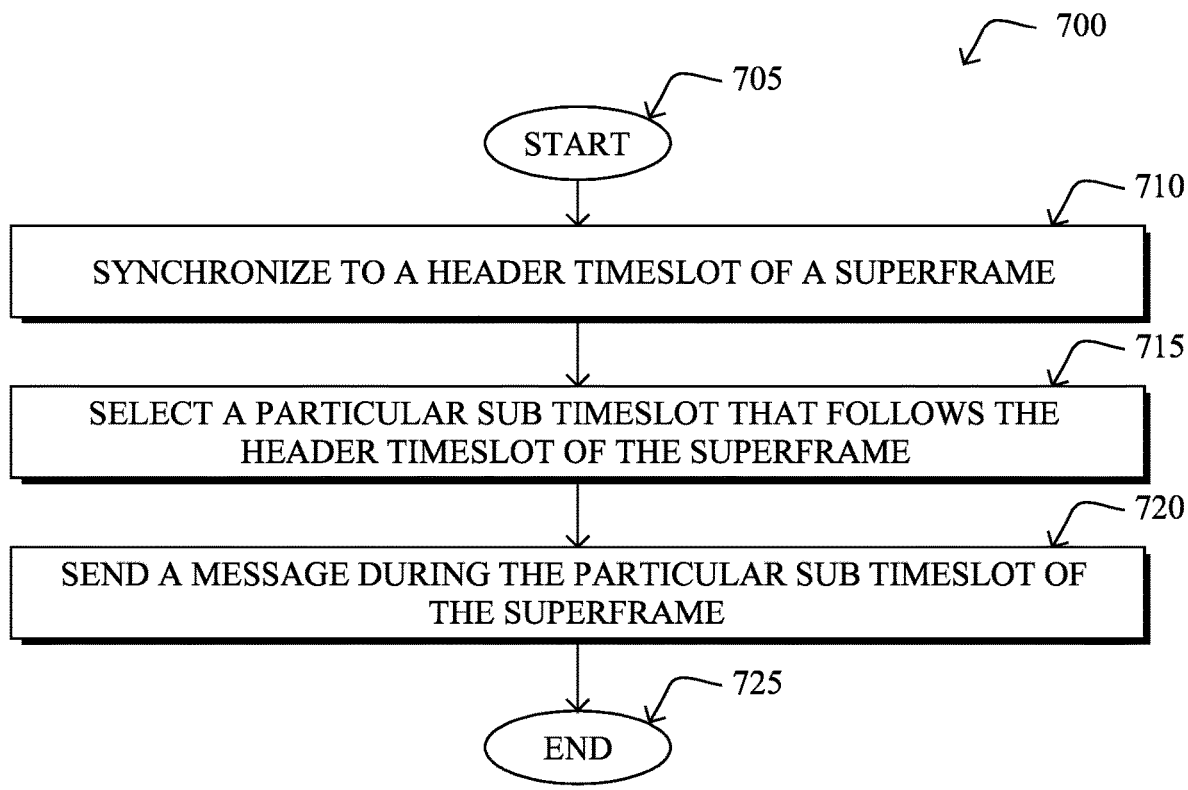

FIGS. 6-7 illustrate example simplified procedures for synchronization and reservation based on sub timeslots for unaligned wireless communications in a network in accordance with one or more embodiments described herein. For example, a non-generic, specifically configured device (e.g., device 200) may perform procedures 600-700 by executing stored instructions (e.g., process 248).

With reference to FIG. 6, a procedure 600 may start at step 605, and continues to step 610, where, as described in greater detail above, the device, configured as a parent device in an unaligned wireless network, may determine a superframe. The superframe can comprise a header timeslot followed by a plurality of sub timeslots. The header timeslot can be 120 ms, and each sub timeslot of the plurality of sub timeslots can be 12 ms.

At step 615, as described in greater detail above, the device may transmit, to a plurality of child devices in the unaligned wireless network, a beacon during the header timeslot. The beacon can comprise i) synchronization information used by the plurality of child devices to synchronize to the header timeslot and ii) reservation information that indicates one or more reserved sub timeslots of the plurality of sub timeslots.

At step 620, the device may receive, from a particular child device of the plurality of child devices, a message during a particular sub timeslot of the plurality of sub timeslots that is different than the one or more reserved sub timeslots. The particular sub timeslot can be unreserved. The message received from the particular child device can comprise a reservation for one or more particular sub timeslots of the plurality of sub timeslots that are different than the one or more reserved sub timeslots and/or an indication that a transmission time of the message is longer than one sub timeslot. Further, the particular child device can selects the particular sub timeslot using MAC randomization and/or generate the message based on 6LoWPAN fragmentation. Procedure 600 then ends at step 625.

With reference to FIG. 7, a procedure 700 may start at step 705, and continues to step 710, where, as described in greater detail above, the device, configured as a child device in an unaligned wireless network, may synchronize to a header timeslot of a superframe. For the synchronization, the device can use synchronization information provided in a beacon that is transmitted by a parent device during the header timeslot of the superframe. The superframe can be 128 ms, and the header timeslot can be 8 ms.

At step 715, as described in greater detail above, the device may select a particular sub timeslot from a plurality of sub timeslots that follow the header timeslot. For the selection, the device can use reservation information provided in the beacon that is transmitted by the parent device during the header timeslot of the superframe. The particular sub timeslot is different than one or more reserved sub timeslots that are indicated by the reservation information. Each sub timeslot in the plurality of sub timeslots can be 12 ms. The particular sub timeslot can be unreserved.

At step 720, the device may send a message during the particular sub timeslot of the plurality of sub timeslots. The message can comprise a reservation for one or more particular sub timeslots of the plurality of sub timeslots that are different than the one or more reserved sub timeslots and/or an indication that a transmission time of the message is longer than one sub timeslot. Further, the device device can select the particular sub timeslot using MAC randomization and/or generate the message based on 6LoWPAN fragmentation. Procedure 700 then ends at step 725.

It should be noted that while certain steps within procedures 600-700 may be optional as described above, the steps shown in FIGS. 6-7 are merely examples for illustration, and certain other steps may be included or excluded as desired. Further, while a particular order of the steps is shown, this ordering is merely illustrative, and any suitable arrangement of the steps may be utilized without departing from the scope of the embodiments herein. Moreover, while procedures 600-700 are described separately, certain steps from each procedure may be incorporated into each other procedure, and the procedures are not meant to be mutually exclusive.

The techniques described herein, therefore, allow for synchronization and reservation in slow hopping technologies (e.g., unaligned wireless networks) that comprise long timeslots. In particular, CSMA/CA within the long timeslots is replaced with a superframe that can be used for synchronizing and scheduling among nodes of unaligned wireless networks. If a sender node is a time parent to a receiver node, then the receiver node may re-synchronize to the specific offset within the superframe. Further, the receiver node can reserve sub timeslots that are not reserved for future transmissions (e.g., for deterministic traffic).

While there have been shown and described illustrative embodiments that provide for synchronization and reservation based on sub timeslots for unaligned wireless communications, it is to be understood that various other adaptations and modifications may be made within the spirit and scope of the embodiments herein. For example, while certain embodiments are described herein with respect to using certain protocols, such as MAC randomization or 6LoWPAN, other suitable protocols may be used, accordingly.

The foregoing description has been directed to specific embodiments. It will be apparent, however, that other variations and modifications may be made to the described embodiments, with the attainment of some or all of their advantages. For instance, it is expressly contemplated that the components and/or elements described herein can be implemented as software being stored on a tangible (non-transitory) computer-readable medium (e.g., disks/CDs/RAM/EEPROM/etc.) having program instructions executing on a computer, hardware, firmware, or a combination thereof. Accordingly this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
   determining, by a parent device in an unaligned wireless network based on a slow hopping technology, a superframe comprising a header timeslot followed by a plurality of sub timeslots;
   transmitting, by the parent device to a plurality of child devices in the unaligned wireless network, a beacon during the header timeslot, wherein the beacon comprises i) synchronization information used by the plurality of child devices to synchronize to the header timeslot for deterministic communications from the plurality of child devices to the parent device and ii) reservation information that indicates one or more reserved sub timeslots of the plurality of sub timeslots; and
   receiving, by the parent device from a particular child device of the plurality of child devices, a message during a particular sub timeslot of the plurality of sub timeslots that is different than the one or more reserved sub timeslots, wherein the particular child device sends the message after synchronizing to the header timeslot for a deterministic communication.

2. The method of claim 1, wherein the message received from the particular child device comprises a reservation for one or more particular sub timeslots of the plurality of sub timeslots that are different than the one or more reserved sub timeslots.

3. The method of claim 1, where in the particular sub timeslot is unreserved.

4. The method of claim 1, wherein the message received from the particular child device comprises an indication that a transmission time of the message is longer than one sub timeslot.

5. The method of claim 1, wherein the particular child device selects the particular sub timeslot using media access control (MAC) randomization.

6. The method of claim 1, wherein the particular child device generates the message based on IPv6 over Low-Power Wireless Personal Area Networks (6LoWPAN) fragmentation.

7. The method of claim 1, wherein the superframe is 128 milliseconds (ms).

8. The method of claim 7, wherein the header timeslot is 8 ms and each of the plurality of sub timeslots is 12 ms.

9. A method, comprising:
   synchronizing, by a child device in an unaligned wireless network based on a slow hopping technology, to a header timeslot of a superframe using synchronization information for a deterministic communication to a parent device, wherein the synchronization information is provided in a beacon that is transmitted by the parent device;
   selecting, by the child device, a particular sub timeslot from a plurality of sub timeslots that follow the header timeslot using reservation information provided in the beacon, wherein the particular sub timeslot is different than one or more reserved sub timeslots that are indicated by the reservation information; and sending, by the child device to the parent device, a message during the particular sub timeslot of the plurality of sub timeslots for the deterministic communication.

10. The method of claim 9, wherein the message comprises a reservation for one or more particular sub timeslots of the plurality of sub timeslots that are different than the one or more reserved sub timeslots.

11. The method of claim 9, wherein the particular sub timeslot is unreserved.

12. The method of claim 9, wherein the message comprises an indication that a transmission time of the message is longer than one sub timeslot.

13. The method of claim 9, wherein selecting, by the child device, the particular sub timeslot from the plurality of sub timeslots that follow the header timeslot using the reservation information provided in the beacon comprises:

selecting, by the child device, the particular sub timeslot from the plurality of sub timeslots using media access control (MAC) randomization.

14. The method of claim 9, further comprising:

generating, by the child device, the message based on IPv6 over Low-Power Wireless Personal Area Networks (6LoWPAN) fragmentation.

15. The method of claim 9, wherein the superframe is 128 milliseconds (ms).

16. The method of claim 15, wherein the header timeslot is 8 ms and each of the plurality of sub timeslots is 12 ms.

17. A tangible, non-transitory, computer-readable medium storing program instructions that cause a parent device in an unaligned wireless network based on a slow hopping technology to execute a process comprising:

determining a superframe comprising a header timeslot followed by a plurality of sub timeslots;

transmitting, to a plurality of child devices in the unaligned wireless network, a beacon during the header timeslot, wherein the beacon comprises i) synchronization information used by the plurality of child devices to synchronize to the header timeslot for deterministic communications from the plurality of child devices to the parent device and ii) reservation information that indicates one or more reserved sub timeslots of the plurality of sub timeslots; and receiving, from a particular child device of the plurality of child devices, a message during a particular sub timeslot of the plurality of sub timeslots that is different than the one or more reserved sub timeslots, wherein the particular child device sends the message after synchronizing to the header timeslot for a deterministic communication.

18. The computer-readable medium as in claim 17, wherein the message received from the particular child device comprises a reservation for one or more particular sub timeslots of the plurality of sub timeslots that are different than the one or more reserved sub timeslots.

19. The computer-readable medium as in claim 17, where in the particular sub timeslot is unreserved.

20. The computer-readable medium as in claim 17, wherein the message received from the particular child device comprises an indication that a transmission time of the message is longer than one sub timeslot.

* * * * *